(12) United States Patent
Nidumolu et al.

(10) Patent No.: US 8,166,196 B2
(45) Date of Patent: Apr. 24, 2012

(54) INTRODUCING CASCADED INTELLIGENT SERVICES IN A SAN ENVIRONMENT

(75) Inventors: Kalyan Chakravarthy Nidumolu, San Jose, CA (US); Parthiban Munusamy, Fremont, CA (US); Anand Parthasarathy, Fremont, CA (US); Prakashkumar Manickam, Fremont, CA (US)

(73) Assignee: Cisco Technology Inc., San Jose, CA (US)

( * ) Notice: Subject to any disclaimer, the term of this patent is extended or adjusted under 35 U.S.C. 154(b) by 282 days.

(21) Appl. No.: 12/413,123

(22) Filed: Mar. 27, 2009

(65) Prior Publication Data

US 2010/0250775 A1    Sep. 30, 2010

(51) Int. Cl.
  *G06F 15/16* (2006.01)
(52) U.S. Cl. .................................................. 709/236
(58) Field of Classification Search .................. 709/236
  See application file for complete search history.

(56) References Cited

U.S. PATENT DOCUMENTS

| | | | |
|---|---|---|---|
| 7,136,383 B1* | 11/2006 | Wilson | 370/392 |
| 7,272,640 B1* | 9/2007 | Kazemi et al. | 709/218 |
| 7,389,393 B1* | 6/2008 | Karr et al. | 711/156 |
| 7,577,729 B1* | 8/2009 | Umbehocker et al. | 709/223 |
| 2004/0088538 A1* | 5/2004 | Isip et al. | 713/153 |
| 2005/0138184 A1* | 6/2005 | Amir | 709/228 |
| 2005/0259654 A1* | 11/2005 | Faulk, Jr. | 370/392 |
| 2006/0087963 A1* | 4/2006 | Jain et al. | 370/217 |
| 2007/0283088 A1 | 12/2007 | Hannigan | |
| 2010/0232440 A1* | 9/2010 | Basavaiah et al. | 370/401 |

FOREIGN PATENT DOCUMENTS

EP    1376984 A1    1/2004

OTHER PUBLICATIONS

International Search Report for International Application No. PCT/US2010/028955, dated Dec. 6, 2010.

* cited by examiner

*Primary Examiner* — Kevin Bates
*Assistant Examiner* — Robert B McAdams
(74) *Attorney, Agent, or Firm* — Patterson & Sheridan LLP

(57) ABSTRACT

Techniques are disclosed for redirecting fiber channel data transmitted between nodes in a fiber channel fabric. The redirection allows traffic sent from a host to a target in a storage area network (SAN) to flow through a cascade of applications provided by certain nodes of the fabric (or in some cases, by external appliances). That is, techniques are disclosed for application chaining in the SAN. Doing so allows the SAN to be used as a true network platform for providing a variety of intelligent services within the network (e.g., data migration, encryption, etc).

21 Claims, 7 Drawing Sheets

INTRODUCING CASCADED INTELLIGENT SERVICES IN A SAN ENVIRONMENT

BACKGROUND

1. Technical Field

Embodiments described in this disclosure generally relate to storage area networks. More particularly, the described embodiments relate to methods and apparatus for introducing cascaded intelligent services for data flowing between a host and a storage device.

2. Description of the Related Art

A storage area network (SAN) provides a high-speed special-purpose network that interconnects different data storage devices and associated data hosts on behalf of a larger network of users. Generally, a SAN is used to attach computer storage devices, e.g., disk arrays, tape libraries, and optical jukeboxes, to a host. The SAN operates such that the storage devices appear to each host as being locally attached, i.e., as though the storage devices where physically connected to the host.

In general, a host accesses one or more storage devices so that traffic flows between the host and a storage device via an existing infrastructure of switches, e.g., a fabric of interconnected Fibre Channel switches. Depending on the number of switches, the path taken by different frames sent between the host and the storage device may differ from one another. In some situations, however, it may be useful to provide intelligent services to the data traffic flowing between a particular host and storage device, and it may be preferable to implement such intelligent services on a switch or appliance device that is not in the existing infrastructure or data path that is located between the host and the storage device. For example, switches positioned in a path of a particular host and storage device pair may not have the necessary intelligence, either hardware or software, to implement such a service. Additionally, one may wish to avoid rewiring the infrastructure between a host and storage device pair so as to not incur significant time, increased complexity, or temporary loss of communication. Further, it may be desirable to locate a service in a remote location from the data path between a host and storage device pair.

SUMMARY

Embodiments described in this disclosure provide techniques for redirecting Fibre Channel data transmitted between nodes in a Fibre Channel fabric. The redirection allows traffic sent from a host to a target in a storage area network (SAN) to flow through a cascade of applications provided by certain nodes of the fabric (or in some cases, by external appliances). One embodiment described herein provides a first switch in a storage area network (SAN). The switch may be a implement the Fibre Channel protocol and be part of a fabric which includes a plurality of Fibre Channel switches.

The first switch may generally include a processor and a memory. The memory may generally be adapted to receive a data frame sent from a host device to a target device. As part of flowing over the SAN from the target to the host, the data frame may redirected to an application chain specifying a sequence of two or more application nodes in the SAN (including the first switch) to receive and process data frames sent from the host to the target.

Additionally, the first switch receives the data frame as being addressed from the host to the first switch. The first switch may perform a service on data included in the redirected data frame. For example, the service may comprise a data migration service (DMS) or storage media encryption (SME) service. After performing the particular service, the first switch may release the data frame as being addressed from the first switch to the target. However, if the application chain includes an additional application node, the data frame may be redirected to the next node by modifying the data frame so as to be addressed from the host to the next node.

Once the data frame is processed by the final application node, in the application chain, the data frame is redirected to the target by modifying the data frame so as to be addressed from the host to the target. Typically, this occurs on the node in the SAN directly attached to the target.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments described herein disclose techniques for redirecting Fibre Channel data transmitted between nodes in a Fibre Channel fabric. The redirection allows traffic sent from a host to a target to flow through a cascade of applications provided by the nodes (or in some cases, by external appliances). Thus, embodiments described herein provide application chaining in a storage area network. Doing so allows data traffic to cascade through multiple intelligent storage applications on a redirected flow between a host and a target.

In one embodiment, a Fibre Channel redirect (FC-redirect) infrastructure allows applications to specify what flows (e.g., what host-target pairs) they are applied to. Further, the FC-redirect infrastructure may determine where in the chain to add to an application as well as determine how to reconfigure the chain when an application in removed. Further still, each application may operate in a manner independent and fully transparent to other application nodes in the chain. For example, traffic between a host and a target redirected to an application chain reaches each node in the chain as though coming directly from the source (the host). Similarly, traffic leaves each application addressed as to the original destination (the target). The FC-redirect infrastructure ensures that traffic leaving an application node in the chain is rededicated to the next application in the chain as if coming from the original source (the host). When traffic leaves the last application in the chain, the FC-redirect infrastructure ensures that the traffic reaches the destination (target) addressed as though the traffic was coming from the original source (the host).

Further, no manual configuration, or importantly, network rewiring, is required for the application chaining provided by the FC-redirect infrastructure. Thus the FC-redirect infrastructure allows the SAN to be used as a true network platform for providing a variety of intelligent services within the network (e.g., data migration, encryption, etc).

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

Figure 1:
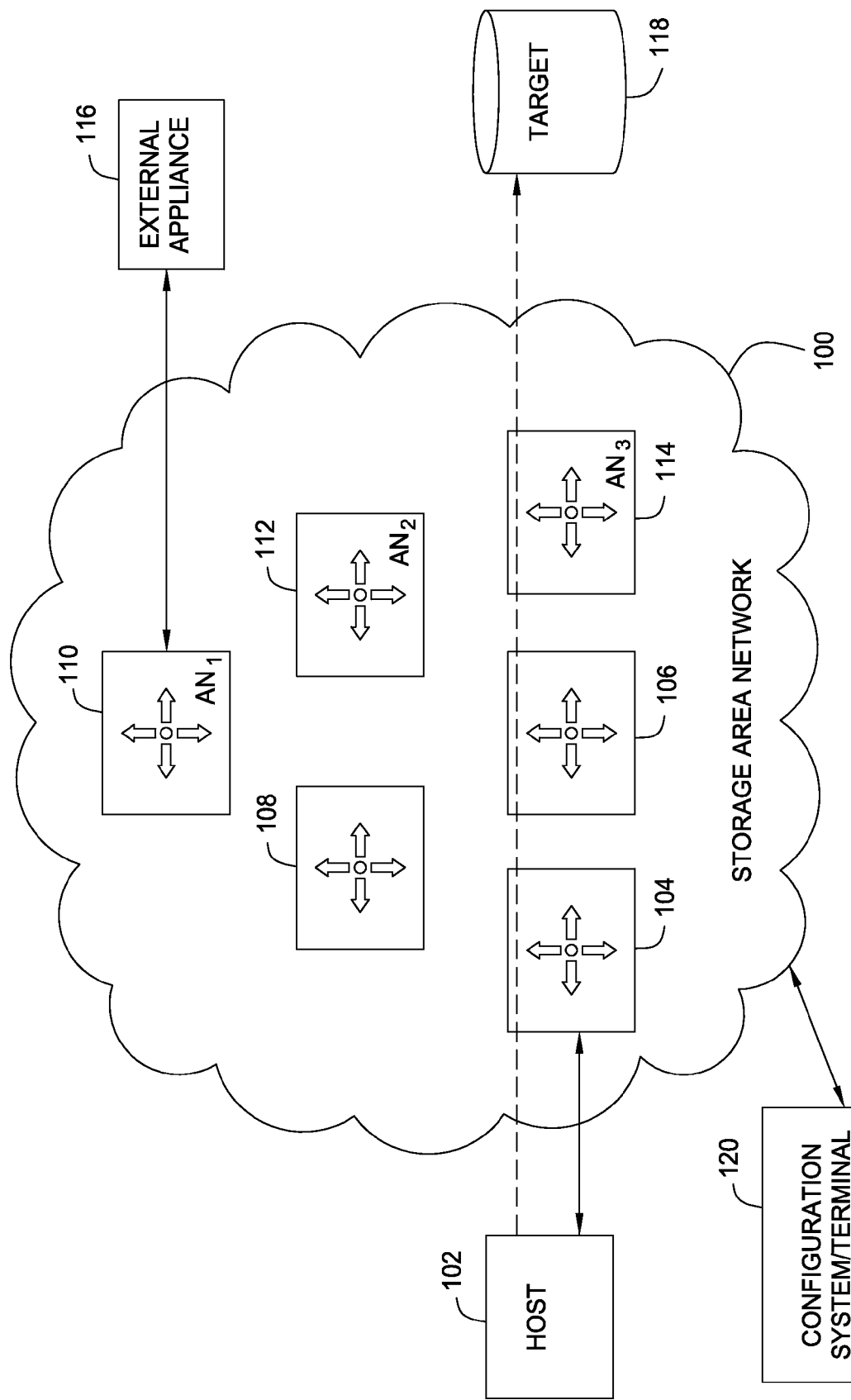
FIG. 1 is a block diagram illustrating an example storage area network (SAN), according to one embodiment described in this disclosure.

FIG. 1 is a block diagram illustrating an example storage area network (SAN) 100, according to one embodiment described in this disclosure. As shown, the SAN 100 includes a target 118, switches 104, 106, 108, 110, 112, and 114. Additionally, a host 102 is connected to SAN 100, as is the target 118, an external appliance 116, and a configuration system/terminal connection 120.

In general, the host 102 may access a target 118 of SAN 100 through one or more of the switches 104-114. Each switch 104-114 provides a Fibre Channel switch compatible with the Fibre Channel (FC) protocol. Additionally, each switch may include a processor and a memory adapted to allow traffic to flow between host 102 and target 114, as well as to perform a variety of intelligent services to data frames flowing over the SAN. The host 102 may access the target 118 through one or more paths that include the switch 104 directly connected to host 102 and the switch 114 directly connected to target 118. For example, host 102 may access target 118 through switches 104, 106, and 114 (as represented by a dashed arrow connecting host 102 and target 114). At the same time, the target 118 may appear to the host 102 as a locally attached storage device. Of course, FIG. 1 represents a simple example of a SAN fabric in which techniques of described embodiments may be practiced. The fabric may have any number of Virtual SANs (VSANs) that include any number and type of host and storage devices or virtual devices.

In one embodiment, the hosts, storage devices, and switches of the SAN 100 may be configured to communicate according to the publicly available Fibre Channel protocol. As is known, the Fibre Channel protocol addresses a general need in networking for very fast transfers of large amounts of information. Fibre Channel networks utilize an arrangement of switches (e.g., switches 104-114), called a fabric, to connect devices (e.g., host 102 and target 118). This approach simplifies the overhead associated with network traffic, as a device with a Fibre Channel port need only manage a point-to-point connection between its port and the Fabric.

In Fibre Channel (FC), each device (e.g., each host, storage device, and switch) is identified by a globally unique, eight (8) byte wide World Wide Name (WWN) assigned by the manufacturer. When the FC devices are interconnected to form a SAN or VSAN, the WWN (along with other parameters) is the primary mechanism to uniquely identify each device. Fibre Channel frames are used for communication among the devices in the SAN. The WWN, however, is not used by the frames. Instead, each device logs on to the FC fabric and is dynamically assigned a unique Fibre Channel address (FCID) by the fabric. The FCID is used in FC networks for end devices to communicate with each other. For example, a frame may include a source FCID and a destination FCID used to identity the source and destination of a given data frame.

In one embodiment, some of the switches present in the FC fabric of SAN 100 may be application nodes configured to provide additional data processing services (e.g., data migration services (DMS) or storage media encryption (SME) services, etc.) Further, in one embodiment, traffic between the host 102 and the target 118 may be redirected to multiple intelligent services provided in a predefined sequence, i.e., to an application chain or cascade. Illustratively, switches 110, 112, and 114 are labeled as $AN_1$, $AN_2$, and $AN_3$ respectively to indicate that these switches are such application nodes representing an application chain formed from these three switches. That is, each of switches 110, 112, and 114 may be configured to provide an intelligent service for processing data frames between the host 102 and target 118. At the same time, the additional data processing performed by one of the switches 110, 112, and 114 is transparent to the others as well as to the host 102 and the target 118.

In one embodiment, the intelligent device may be integrated into a switch (as shown for switches 110, 112 and 114) or provided as an appliance device (as shown for external appliance 116) that resides in or outside the SAN 100. In either case, traffic that flows between a specific host and target pair (e.g., host 102 and target 118) may be redirected to one or more of the switches 110, 112, and 114 such that a cascade of chained services is provided for such redirected traffic.

Any suitable mechanism may be used to redirect traffic between a particular host and storage device to a cascade of intelligent services (e.g., a sequence of services provided by switches 110, 112, and 114, in order). In one embodiment, one or more of the switches in SAN 100 may be configured with a Network address translation (NAT) access control list (ACL) redirect table used to redirect traffic to successive nodes of an application chain. Each entry in the table specifies a binding between a particular input source/destination pair and a redirected source/destination pair. The redirect table may be used to redirect frames sent from the host 102 to the first application node in the application chain (i.e., switch 110 in this example). For example, when the switch associated with the host 102, i.e., switch 104, receives traffic with an FCID source of the host and an FCID destination of the target 118, an ACL entry may be used to redirect such a frame to the first node in an application chain, i.e., to ($AN_1$) of switch 110. When the switch 110 receives the redirected frame, it implements a service on the data in the frame. Once the frame is released from the switch 110, an entry in the redirect table is used to redirect the frame to the next successive node in the application chain (switch 112 in this example). This process continues until the traffic leaves last node of the application chain (switch 114 in this example), at which point the frame is directed to the target 118 with a source/destination pair of (Host, Target). Thus, the frame arrives at the target 118 as though being sent from the host directly 102, mirroring what occurs in the absence of any application chaining or redirect.

In one embodiment, the configuration system 120 may be used to add (or remove) nodes from an application chain. For example, the configuration system 120 may be used to establish a terminal connection with the elements of the SAN 100 and distribute the ACL redirect table appropriate for a given application chain. In such a case, the configuration system 120 may create, delete, or modify entries in the ACL redirect table to include the additional node in the chain and distribute such entries to the switches of the SAN 100.

Alternatively, an FC-redirect configuration system may execute on each switch in the fabric. In such a case, the configuration system running on the switch with an application node being inserted may evaluate the fabric, as well as the current application cascade (if any), and determine an appropriate location within the cascade for the application being inserted. Further, the configuration system may distribute the location to the other switches in the fabric participating in the FC-redirect (i.e., all nodes configured to redirect traffic through an application cascade). In such a case, each switch may update the entries in a NAT ACL table to add the application to the cascade in the appropriate location.

Similarly, a node may request to be removed from the chain and the configuration system 120 may modify entries in the ACL table as appropriate. Thus, in some cases, the application chain may be relatively self-configuring, based on the particular application nodes included in the chain.

Figure 2:
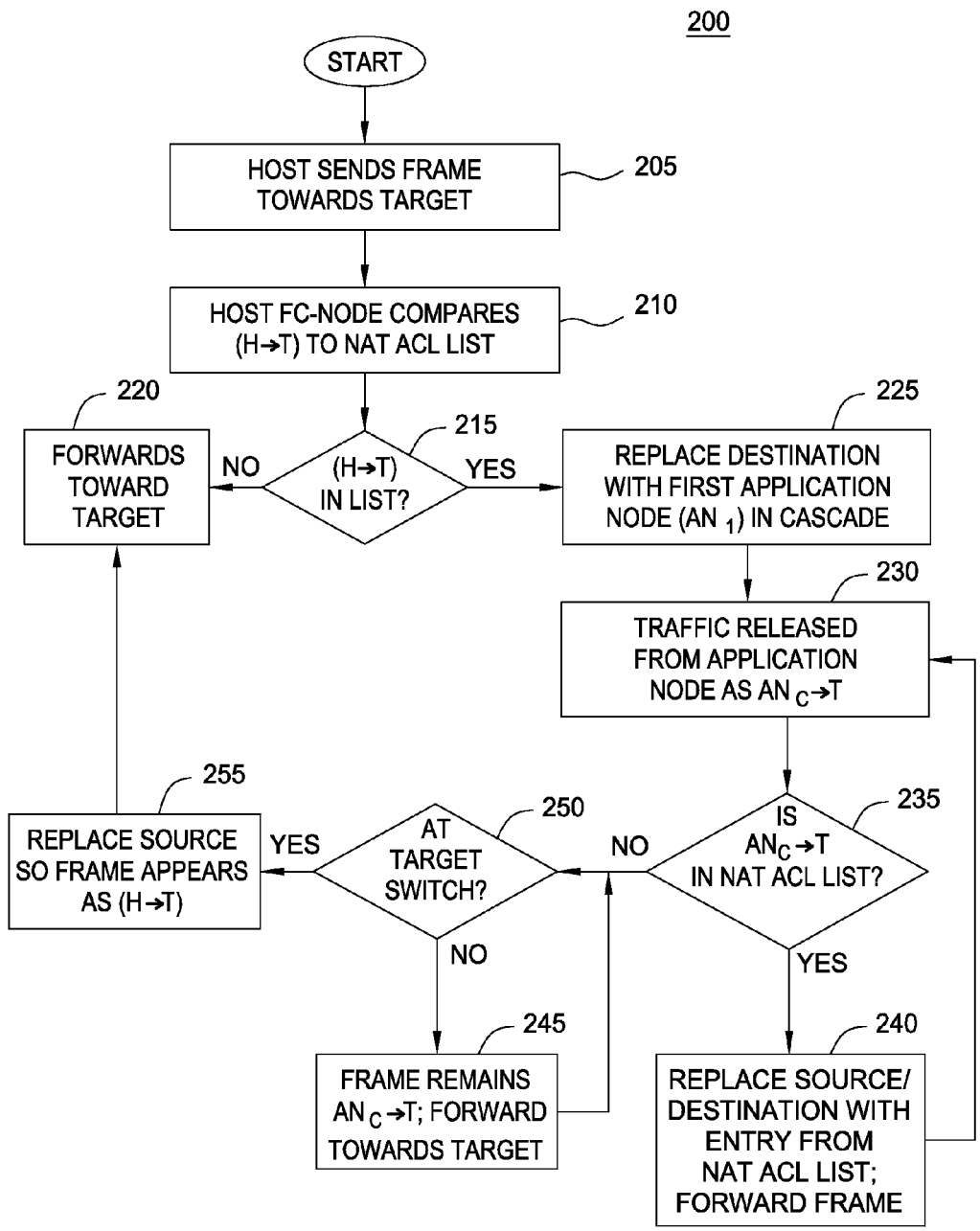
FIG. 2 is a flow chart illustrating a method for redirecting fibre channel traffic through a cascade of application services, according to one embodiment described in this disclosure.

FIG. 2 is a flow chart illustrating a method 200 for redirecting fibre channel traffic through a cascade of application nodes, according to one embodiment. As shown, the method 200 begins at step 205 where a host sends a frame addressed from the host to a target device present on a SAN. At step 210, the switch directly connected to the host may compare the received frame with entries in an ACL redirect list. For example, the switch attached to the host may inspect the frame to identify a source/destination pair of FCIDs, e.g., a host (H) and target (T), represented symbolically as (H→T). At step 215, the switch may determine whether the ACL redirect list includes an entry for the (H→T) source/destination pair included in the frame. If not, then at step 220, the switch forwards the frame towards the target (T). Otherwise, at step 225, the switch may redirect the frame towards the first application node ($AN_1$) in an application chain. As described above, the application node ($AN_1$) may be one of the switches in the SAN fabric configured to provide additional data processing services or may be an external appliance itself connected to the SAN. In either case, the redirected frame reaches the application node ($AN_1$) which provides a service for data in the frame (e.g., migration, encryption, etc). Once the first application node $AN_1$ in the chain completes processing the frame, it may be released from that node with a source destination pair of ($AN_1$→T).

Upon release from the first application node ($AN_1$), the source/destination pair of ($AN_1$→T) is compared with entries in the ACL redirect list (step 235). If the particular source/destination pair is present in the ACL redirect list, it is replaced with redirected source/destination pair specified in the ACL redirect list (step 240). That is, the frame is redirected to the next application node in the chain (e.g., a second application node ($AN_2$)). The frame is then forwarded toward that application node. In one embodiment, the source/destination pair may be redirected as (H→$AN_2$). This results in the frame being directed to the second application node ($AN_2$) with a source address of the original sending host (H). Thus the operation of the first application node ($AN_2$) remains transparent to the second application node ($AN_2$). Upon release from the second application node ($AN_2$), the source/destination pair of ($AN_2$→T) is compared with entries in the ACL redirect list (step 235). If the application chain includes a third node, then the source/destination pair is redirected towards that node as (H→$AN_3$) (step 240). The process reflected in steps 230, 235 and 240 may repeat as many times as necessary to redirect the frame as (H→$AN_X$) to each application node in the application chain.

Upon release from the final application node ($AN_F$) in the application chain, the frame has a source/destination pair of ($AN_F$→T). At step 250, if the frame is at the target switch (i.e., the switch directly connected to the target (T)), then the source/destination pair is replaced with (H→T) and forwarded towards the target (step 220). Otherwise, the source/destination pair remains as ($AN_F$→T) and forwarded towards the target (T) until reaching the switch directly connected to the target (T) (steps 245 and 250), where the source destination pair is replaced with (H→T). That is, once the frame reaches the switch in the SAN connected to the target, the source destination/pair is replaced with the original (H→T) values. Thus, the frame arrives at the target as though sent from the host (H). In this way the application chain remains fully transparent to the target (T).

For traffic originating from the target (T) (e.g., where the target is responding to a request for a block of data from a storage device provided to the host (H) by the SAN, entries in the ACl redirect table may be used to redirect traffic to one or more application nodes in a similar manner. For example, assume the final application node provides a storage media encryption (SME) service for data stored on the storage device at the target. In such a case, data requested by the host (H) may be redirected to the final application node when being passed from the target to the host (i.e., from (T→H) to (T→$AN_F$). Upon release form this application node, the source/destination pair could be redirected to other application nodes or back to the original (T→H) pair and forwarded towards the host.

Figure 3:
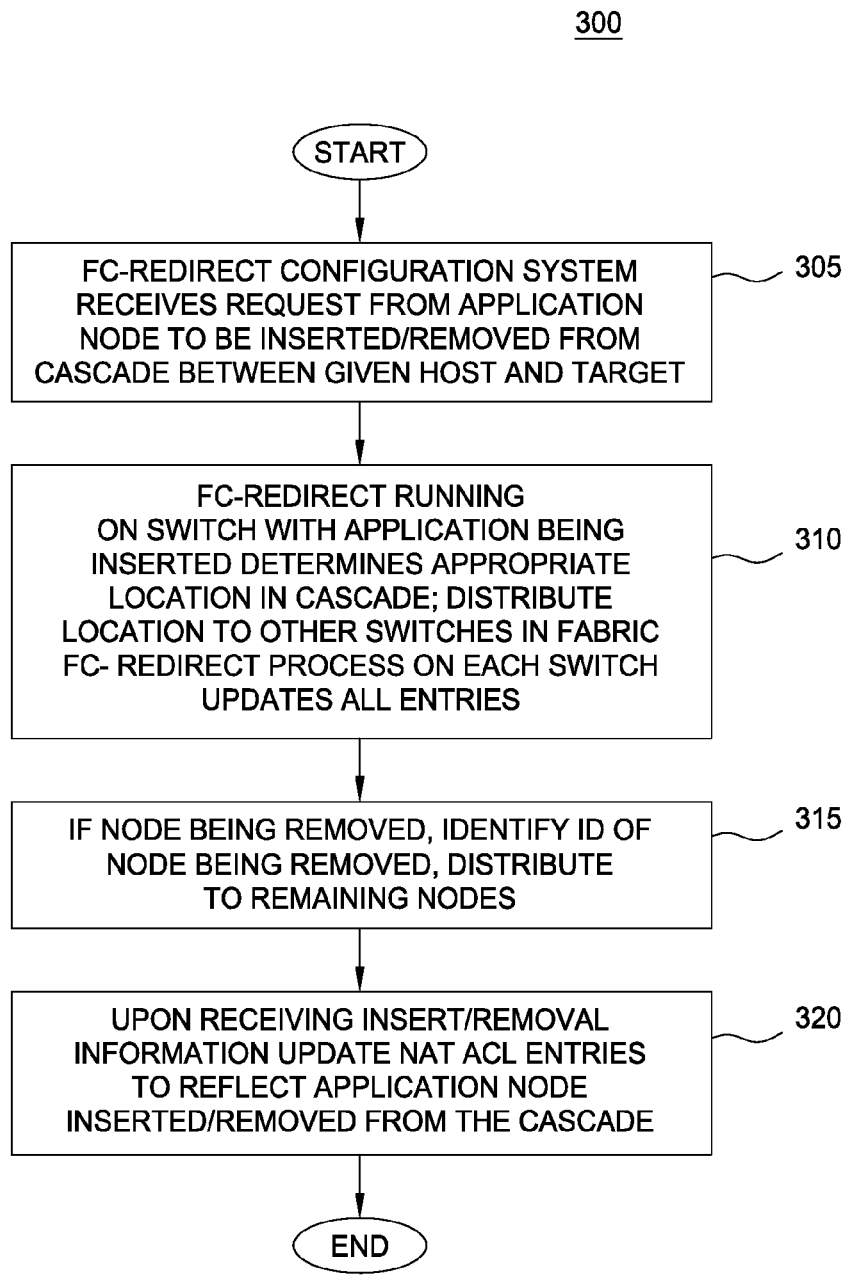
FIG. 3 is a flowchart illustrating a method for defining an application cascade, according to one embodiment described in this disclosure.

FIG. 3 is a flowchart illustrating a method 300 for defining an application chain or cascade, according to one embodiment described in this disclosure. As shown, the method 300 beings at step 305 where the FC-redirect configuration system (e.g., the configuration system 120 of FIG. 1) receives a request from an application node to be inserted/removed from an application cascade defined for a given host and target pair.

At step 310, if an additional application node is being inserted into an existing cascade, the node providing the application being inserted may determine an appropriate position in the cascade. As stated above, the additional node itself may indicate a preferred position in the chain (e.g., first, last) or indicate what other application nodes should precede or follow the particular node requesting to join an application chain. Once the application node being inserted determines a position in the chain at which to insert itself, the node may generate the appropriate entries for the ACL table on that node. Further, the configuration system running on that node may distribute the location of the application in the application cascade to the other switches in the fabric participating in the FC-redirect (i.e., all nodes configured to redirect traffic through an application cascade). In such a case, each switch may update their NAT ACL table to add the application to the cascade in the appropriate location.

At step 315, if an existing application node is being removed from the existing cascade, the configuration system running on the node being removed may identify existing entries in the ACL redirect table referencing the node being removed that redirect frames to that node as part of the cascade. Such entries may be removed from the ACL redirect table. Additionally, the application node being removed from the chain may notify other nodes in the fabric, allowing the other nodes to update their ACL redirect tables as well. Doing so allows each node in the fabric to "close the gap" in the application chain created by the removal of one of the nodes from the cascade.

At step 320, after entries are generated to add (or remove) an application node from a cascade and distributed to the SAN, the switches and/or application nodes update their respective ACL redirect tables to reflect the application node being inserted/removed from the cascade.

Figure 4A:
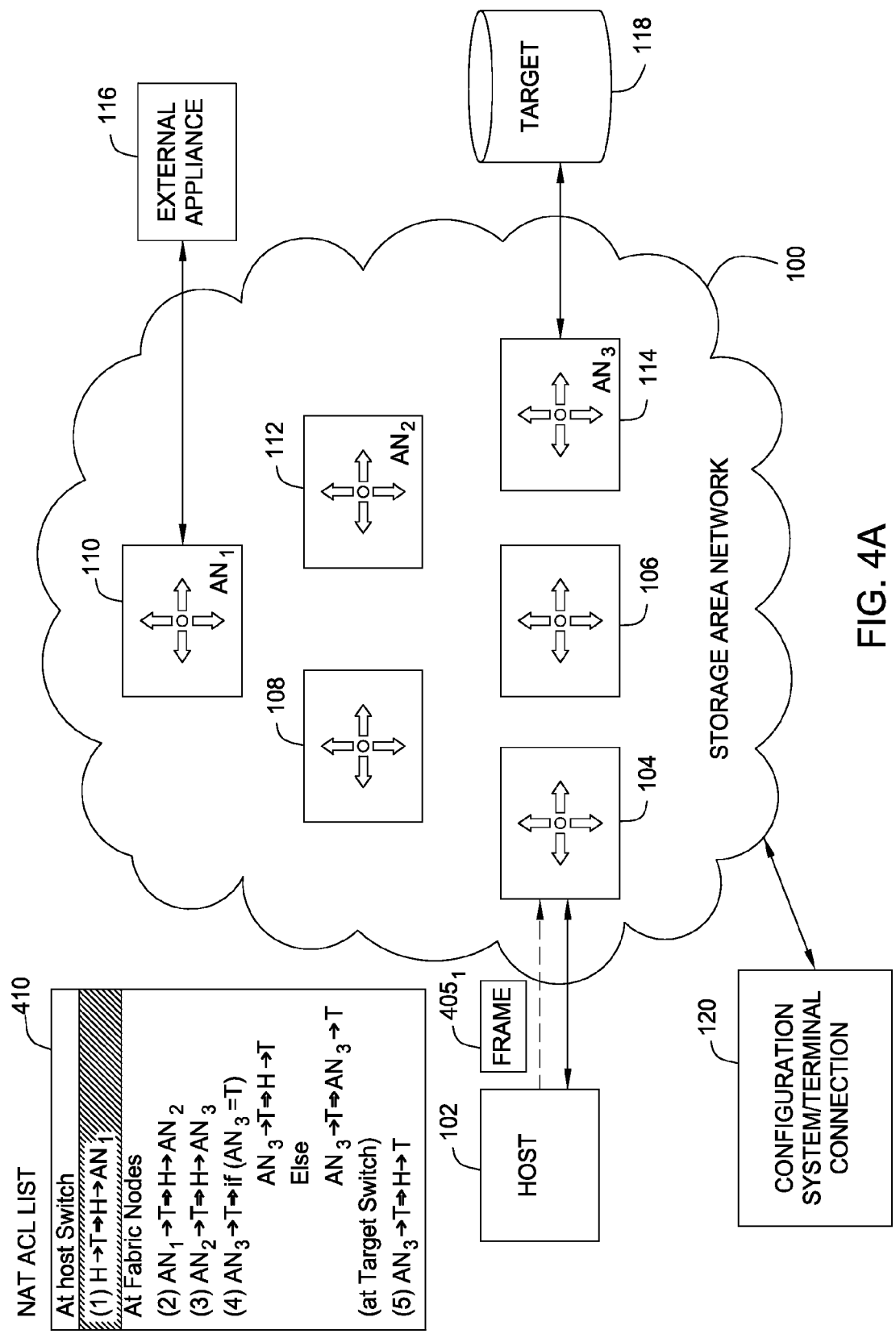
FIGS. 4A-4D illustrate an example of Fibre Channel traffic being redirected through an application cascade, according to one embodiment described in this disclosure.

FIGS. 4A-4D illustrate an example of fibre channel frames being redirected through SAN 100 using an ACL redirect table 410. In this example, switches 110, 112, and 114 correspond to an application chain of three nodes (represented as $AN_1 \rightarrow AN_2 \rightarrow AN_3$). For example, FIG. 4A shows a frame 405 being sent from the host 102 to the target 118. Illustratively, the frame 405 is first directed to the switch which attaches host 102 to the fabric of SAN 100 (represented by dashed arrow 415). As shown, the switch 104 receives the frame 405 from host 102. In response, the switch 104 inspects the frame to identify a source and destination, i.e., host (H) 102 and target (T) 118, represented as (H→T). Further, the switch 104 evaluates this source/destination pair relative to the ACL redirect table 410. In this case, the bolded entry in the ACL redirect table 410 indicates that a frame addressed as (H→T) should be redirected to switch 110 (i.e., to $AN_1$). Accordingly, the frame 405 leaves switch 104 as (H→$AN_1$).

Figure 4B:
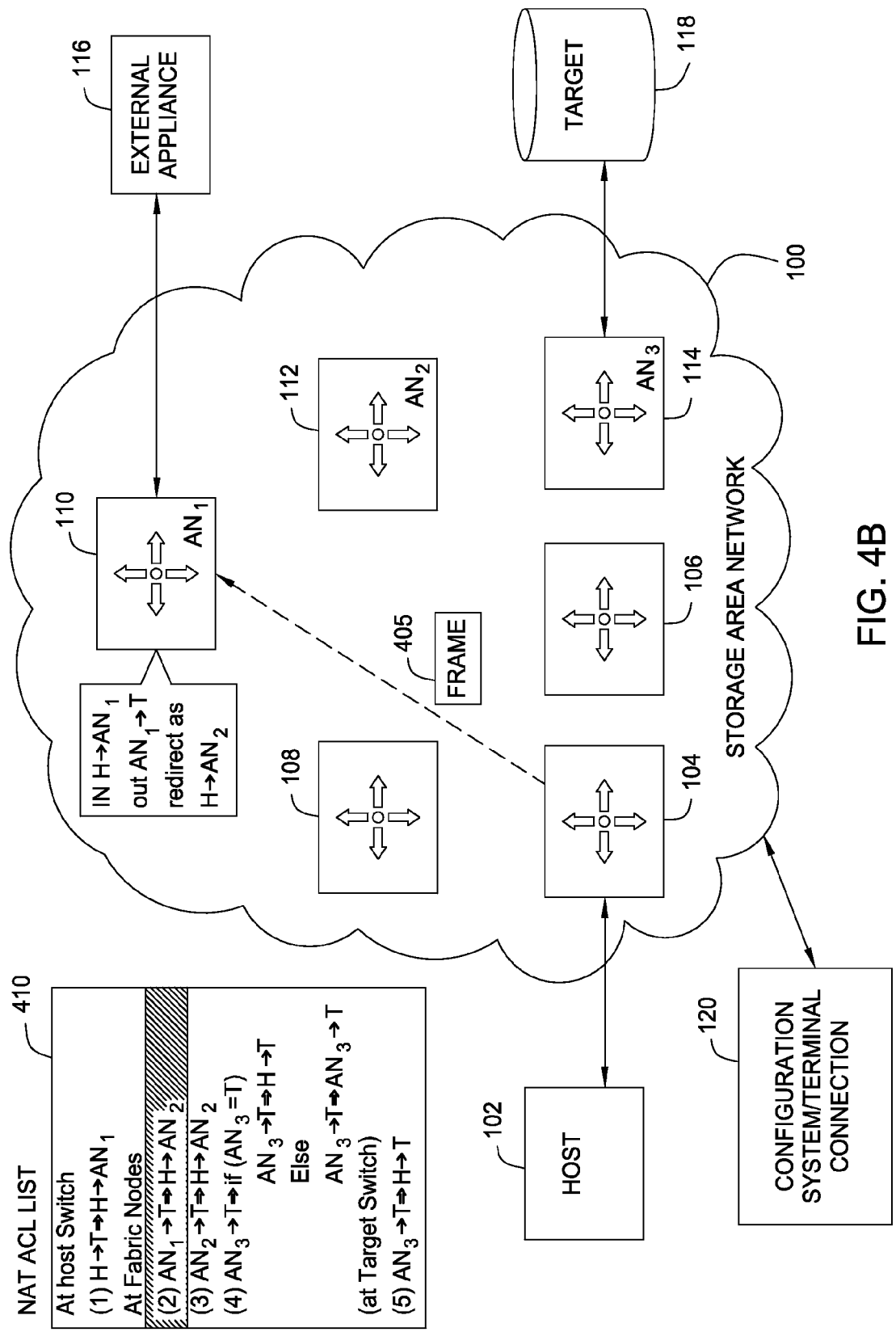

This result is shown in FIG. 4B where the frame 405 is shown in transit from switch 104 to switch 110. Once received by switch 110, the frame is processed according to the service provided by ($AN_1$). As stated, the service may be part of the switch 110 itself, or provided by an external appliance. For example, assume that the service provided by the first application node in the chain ($AN_1$) is to forward a copy of the data in frame 405 to external appliance 116. Regardless of the particular service provided by this node in the application chain, the frame 405 arrives at switch 110 as (H→$AN_1$) and leaves as ($AN_1$→T). However, upon release from switch 110, the source/destination pair of ($AN_1$→T) is evaluated against the ACL redirect list 410. In FIG. 4B, the bolded entry in the ACL redirect table 410 indicates that a frame addressed as ($AN_1$→T) should be redirected to switch 112 (i.e., to a second application node ($AN_2$) in the chain. Accordingly, the frame 405 leaves switch 110 as (H→$AN_2$).

Figure 4C:
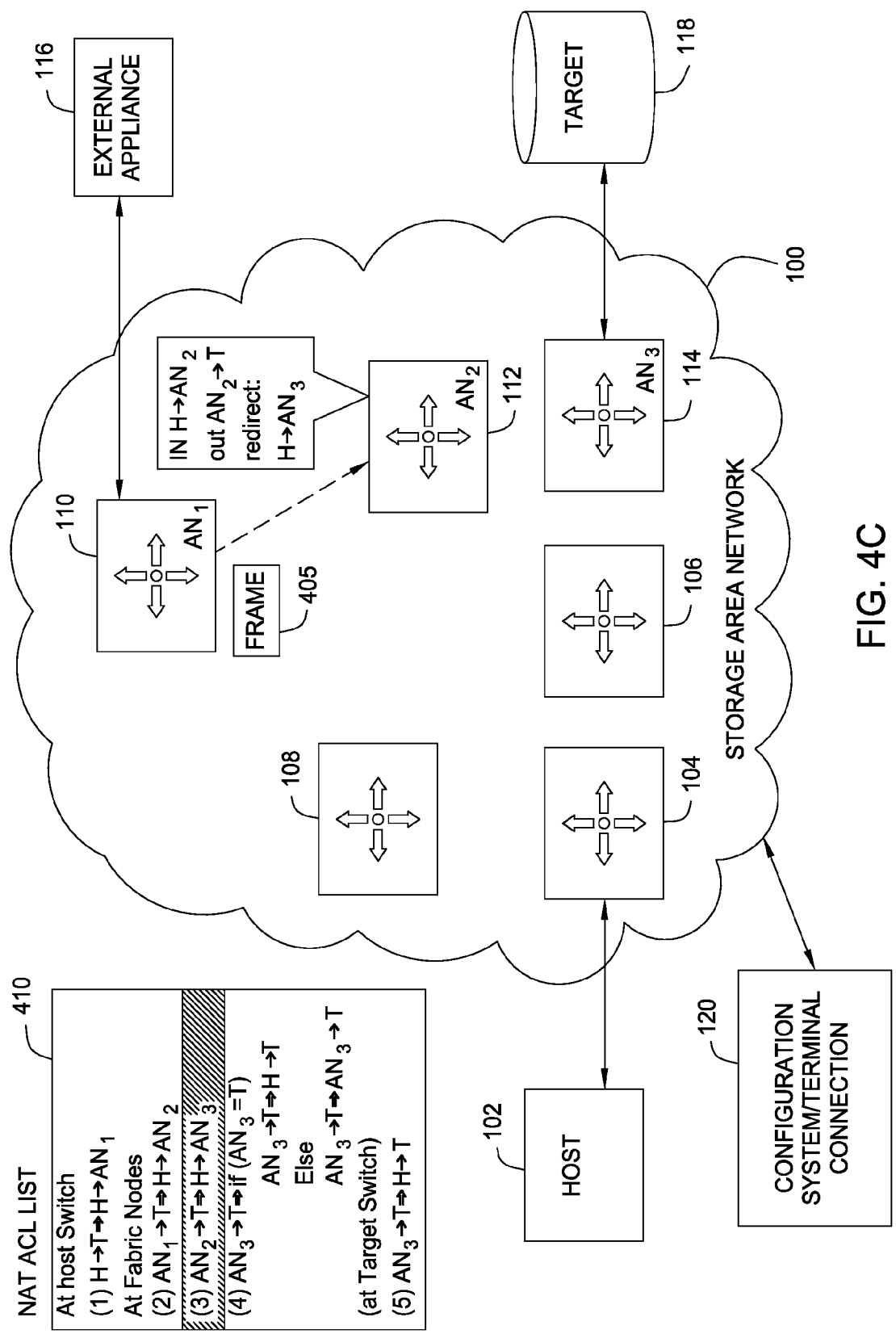

The result is shown in FIG. 4C, where the frame 405 is shown in transit from switch 110 ($AN_1$) to switch 112 ($AN_2$). Once received by switch 112, the frame is processed according to the service provided by ($AN_2$). The frame 405 arrives at switch 112 as (H→$AN_2$) and leaves as ($AN_2$→T). That is, the frame 405 arrives as though being sent from the host (H) 102 and leaves as being directed to the target (T) 118. However, upon release from switch 112, the source/destination pair of ($AN_2$→T) is evaluated against the ACL redirect list 410. In FIG. 4C, the bolded entry in the ACL redirect table 410 indicates that a frame addressed as ($AN_2$→T) should be redirected to switch 114 (i.e., to a third application node ($AN_3$) in the chain). Accordingly, the frame 405 leaves switch 112 as (H→$AN_3$).

Figure 4D:
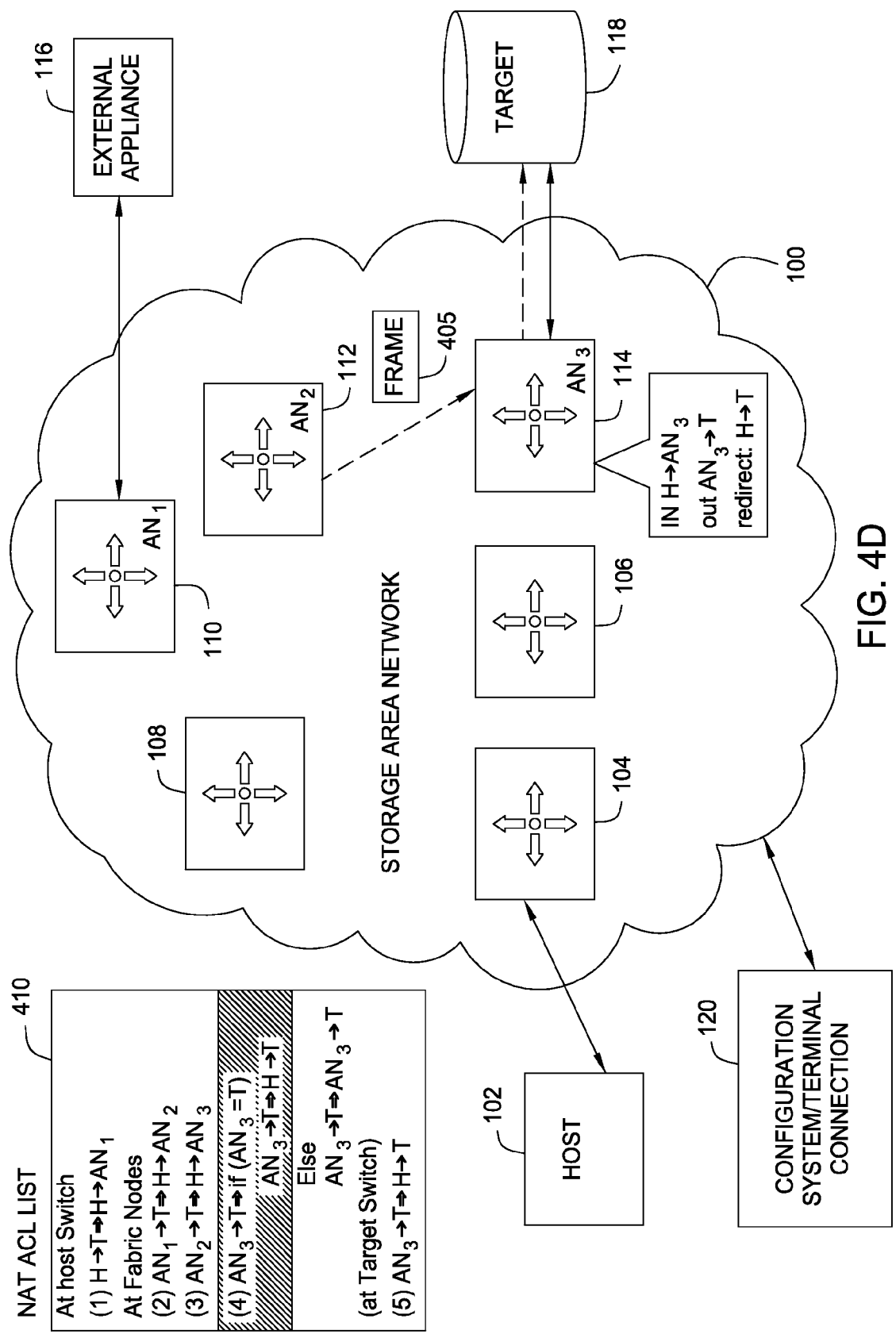

The result is shown in FIG. 4D, where the frame 405 is shown in transit from switch 112 ($AN_2$) to switch 114 ($AN_3$). Once received by switch 114, the frame is processed according to the service provided by ($AN_3$). The frame 405 arrives at switch 114 as (H→$AN_3$) and leaves as ($AN_3$→T). That is, the frame 405 arrives as though being sent from the host (H) 102 and leaves as being directed to the target (T) 118. However, upon release from switch 114, the source/destination pair of ($AN_3$→T) is evaluated against the ACL redirect list 410. In FIG. 4D, the bolded entry in the ACL redirect table 410 indicates that a frame addressed as ($AN_3$→T) should be redirected to target 118. That is, as application node ($AN_3$) is the final node in this example cascade, traffic leaving this node should be redirected towards the target 118. Illustratively, switch 114 is also the switch directly attached to the target 118. Accordingly, the traffic leaving switch 114 addressed as ($AN_3$→T) is redirected as (H→T). This results in the frame being forwarded to target 118 with a source/destination pair of (H→T). Thus, the frame 405 arrives at host (H) 102 and leaves as being directed to the target (T) 118, making the operation of the application chain of ($AN_1$→$AN_2$→$AN_3$) fully transparent to target 118.

Advantageously, embodiments described herein disclose techniques for redirecting fibre channel data transmitted between nodes in a SAN. The redirection allows traffic sent from a host to a target to flow through a cascade of applications provided by the nodes (or in some cases, by external appliances). Each application in the chain is independent of other applications in the chain. Traffic is redirected to each successive node in the application chain as though it were coming from the original source. Further, traffic leaves each application as though destined for the original destination. Thus, each application node may operate on fibre channel fabric independently of one another and transparently to both the host and the target.

An ACL redirect table may specify how to redirect traffic from one application to the next in the chain. A configuration system may be used to insert or removed applications nodes from the chain. Importantly, as the FC-redirect infrastructure handles creating the application chain using the ACL redirect table, no manual configuration or rewiring of SAN network topology is required to create, maintain, or modify a particular application chain. Doing so allows the SAN to be used as a true network platform for providing a variety of intelligent services within the network (e.g., data migration, encryption, etc).

While the foregoing is directed to embodiments of the present disclosure, other and further embodiments of the disclosure may be devised without departing from the basic scope thereof, and the scope thereof is determined by the claims that follow.

The invention claimed is:

1. A first switch in a storage area network (SAN), comprising:
  a processor; and
  a memory, wherein the memory is adapted for:
    receiving a data frame sent from a host device attached to the SAN to a target device attached to the SAN, wherein the data frame has been redirected to an application chain which specifies a sequence of two or more application nodes in the SAN, including the first switch, to receive and process data frames sent from the host to the target, wherein the first switch receives the data frame as being addressed from the host to the first switch, and wherein each of a plurality of switches in the storage area network, including the application nodes of the application chain, includes a network address translation (NAT) access control list (ACL) redirect table, wherein the ACL redirect table specifies a plurality of redirected source/destination addresses for data frames received by a respective switch having a specified pair of source/destination addresses;
    performing a service on data included in the redirected data frame;
    releasing the data frame, wherein the data frame is released as being addressed from the first switch to the target;
    upon determining the application chain includes an additional application node in the sequence of two or more application nodes, redirecting the data frame by modifying the data frame so as to be addressed from the host to the additional application node.

2. The system of claim 1, wherein the memory of the first switch is further adapted for, upon determining the first switch is a final application node, in the sequence of two or more application nodes, redirecting the data frame to the target by modifying the data frame so as to be addressed from the host to the target.

3. The system of claim 1, wherein the service performed on the data in the redirected data frame comprises a storage media encryption service.

4. The system of claim 1, wherein the service performed on the data in the redirected data frame comprises a data migration service.

5. The system of claim 1, wherein the service performed on the data in the redirected data frame comprises forwarding the data frame towards an external appliance.

6. The system of claim 1, further comprising:
a configuration system, wherein the configuration system is adapted for:
receiving a request to insert a second switch into the application chain, wherein the second switch is configured to perform a service on data redirected to the second switch,
determining a position in the application chain for the second switch,
generating one or more entries to add, remove, or modify in the ACL redirect table on one or more the plurality of switches in order to add the second switch to the application chain, and
distributing the one or more generated entries to the plurality of switches in the storage area network.

7. The system of claim 1, further comprising:
a configuration system, wherein the configuration system is adapted for:
receiving a request to remove the first switch from the application chain, and
in response to the request, removing one or more entries from the ACL redirect table on one or more the plurality of switches in order to remove the first switch from the application chain,
generating one or more entries to add or modify in the ACL redirect table on one or more of the plurality of switches, and
distributing the one or more generated entries to one or more of the plurality of switches in the storage area network.

8. The system of claim 1, wherein the storage area network (SAN) implements a Fibre Channel protocol.

9. A non-transitory computer-readable medium, containing a program, which, when executed on a first switch in a storage area network (SAN) performs an operation, comprising:
receiving a data frame sent from a host device attached to the SAN to a target device attached to the SAN, wherein the data frame has been redirected to an application chain which specifies a sequence of two or more application nodes in the SAN, including the first switch, to receive and process data frames sent from the host to the target, wherein the first switch receives the data frame as being addressed from the host to the first switch, and wherein each of a plurality of switches in the storage area network, including the application nodes of the application chain, includes a network address translation (NAT) access control list (ACL) redirect table, wherein the ACL redirect table specifies a plurality of redirected source/destination addresses for data frames received by a respective switch having a specified pair of source/destination addresses;
performing a service on data included in the redirected data frame;
releasing the data frame, wherein the data frame is released as being addressed from the first switch to the target;
upon determining the application chain includes an additional application node in the sequence of two or more application nodes, redirecting the data frame by modifying the data frame so as to be addressed from the host to the additional application node.

10. The non-transitory computer-readable medium of claim 9, wherein the operation further comprises, upon determining the first switch is a final application node, in the sequence of two or more application nodes, redirecting the data frame to the target by modifying the data frame so as to be addressed from the host to the target.

11. The non-transitory computer-readable medium of claim 9, wherein the service performed on the data in the redirected data frame comprises a storage media encryption service.

12. The non-transitory computer-readable medium of claim 9, wherein the service performed on the data in the redirected data frame comprises a data migration service.

13. The non-transitory computer-readable medium of claim 9, wherein the service performed on the data in the redirected data frame comprises forwarding the data frame towards an external appliance.

14. The non-transitory computer-readable medium of claim 9, wherein the SAN implements a Fibre Channel protocol.

15. A method, comprising:
receiving a data frame sent from a host device attached to a storage area network (SAN) to a target device attached to the SAN, wherein the data frame has been redirected to an application chain which specifies a sequence of two or more application nodes in the SAN, including a first switch, to receive and process data frames sent from the host to the target, wherein the first switch receives the data frame as being addressed from the host to the first switch, wherein each of a plurality of switches in the storage area network, including the application nodes of the application chain, includes a network address translation (NAT) access control list (ACL) redirect table, wherein the ACL redirect table specifies a plurality of redirected source/destination addresses for data frames received by a respective switch having a specified pair of source/destination addresses;
performing a service on data included in the redirected data frame;
releasing the data frame, wherein the data frame is released from the first switch as being addressed from the first switch to the target; and
upon determining the application chain includes an additional application node in the sequence of two or more application nodes, redirecting the data frame by modifying the data frame so as to be addressed from the host to the additional application node.

16. The method of claim 15, wherein the memory of the first switch is further adapted for, upon determining the first switch is a final application node, in the sequence of two or more application nodes, redirecting the data frame to the target by modifying the data frame so as to be addressed from the host to the target.

17. The method of claim 15, wherein the service performed on the data in the redirected data frame comprises one of a storage media encryption service and a data migration service.

18. The method of claim 15, wherein the service performed on the data in the redirected data frame comprises forwarding the data frame towards an external appliance.

19. The method of 15, further comprising:
receiving a request to insert a second switch into the application chain, wherein the second switch is configured to perform a service on data redirected to the second switch;
determining a position in the application chain for the second switch;
generating one or more entries to add, remove, or modify in the ACL redirect table on one or more the plurality of switches in order to add the second switch to the application chain; and
distributing the one or more generated entries to the plurality of switches in the storage area network.

20. The method of claim 15, further comprising:
receiving a request to remove the first switch from the application chain; and
in response to the request, removing one or more entries from the ACL redirect table on one or more the plurality of switches in order to remove the first switch from the application chain;
generating one or more entries to add or modify in the ACL redirect table on one or more of the plurality of switches; and
distributing the one or more generated entries to one or more of the plurality of switches in the storage area network.

21. The method of claim 15, wherein the storage area network (SAN) implements a Fibre Channel protocol.

\* \* \* \* \*

UNITED STATES PATENT AND TRADEMARK OFFICE
CERTIFICATE OF CORRECTION

PATENT NO. : 8,166,196 B2
APPLICATION NO. : 12/413123
DATED : April 24, 2012
INVENTOR(S) : Nidumolu et al.

It is certified that error appears in the above-identified patent and that said Letters Patent is hereby corrected as shown below:

In the Detailed Description:

Column 4, Line 8, please delete "identity" and insert -- identify -- therefor;

Column 6, Line 21, please delete "ACI" and insert -- ACL -- therefor.

Signed and Sealed this
Fourteenth Day of August, 2012

David J. Kappos
*Director of the United States Patent and Trademark Office*